United States Patent [19]
Lichtenberg et al.

[11] Patent Number: 5,971,319
[45] Date of Patent: Oct. 26, 1999

[54] SYSTEM FOR CONVERTING JET AIRCRAFT TO PARABOLIC FLIGHT OPERATION

[75] Inventors: Bryon K. Lichtenberg, Gun Barrel City, Tex.; Peter H. Diamandis, Rockville, Md.; Raymond J. Cronise, Madison, Ala.; Michael L. Mahaffey, Tucson, Ariz.

[73] Assignee: Zero-Gravity Corporation, Rockville, Md.

[21] Appl. No.: 08/923,918

[22] Filed: Sep. 5, 1997

[51] Int. Cl.$^6$ ...................................... B64D 11/00
[52] U.S. Cl. ............................ 244/1 R; 60/39.08; 60/430; 410/118; 244/78; 244/118.5
[58] Field of Search ................. 244/1 R, 118.1, 244/137.1, 118.5, 78; 410/118; 60/403, 420, 421, 430, 39.08

[56] References Cited

U.S. PATENT DOCUMENTS

| | | | |
|---|---|---|---|
| 3,336,069 | 8/1967 | Bayer et al. | 410/118 |
| 3,480,239 | 11/1969 | Jensen et al. | 244/118.1 |
| 3,578,274 | 5/1971 | Ginn | 244/137.1 |
| 4,511,016 | 4/1985 | Doell | 60/39.08 |
| 4,754,940 | 7/1988 | Deter | 244/78 |
| 4,819,697 | 4/1989 | Randa et al. | 138/30 |
| 5,085,382 | 2/1992 | Finkenbeiner | 244/121 |

FOREIGN PATENT DOCUMENTS

| | | | |
|---|---|---|---|
| 566915 | 5/1958 | Belgium | 244/118.1 |
| 2303711 | 3/1975 | France | 244/118.1 |

OTHER PUBLICATIONS

L.R. Neu et al., "KC–135 Modifications Manual," Apr. 5, 1982.

*Primary Examiner*—Galen L. Barefoot
*Attorney, Agent, or Firm*—Banner & Witcoff, Ltd.

[57] ABSTRACT

A system and method is provided for rapidly reconfiguring a jet aircraft from a cargo or passenger configuration into a parabolic flight configuration. In the parabolic flight configuration, a zero-gravity condition is created in the aircraft cabin to simulate a weightless atmosphere which can be provided as entertainment to paying customers. Various aspects of the invention include a hydraulic system design change which prevents loss of hydraulic function during a zero-gravity condition and a strap-down accelerometer which provides a visual indication of the parabolic flight condition. Additional interior modifications include removable padding areas, a dual-purpose interior gill liner, modified oxygen systems, handrail attachment fixtures, modified emergency lighting systems, and a palletized floor assembly.

25 Claims, 18 Drawing Sheets

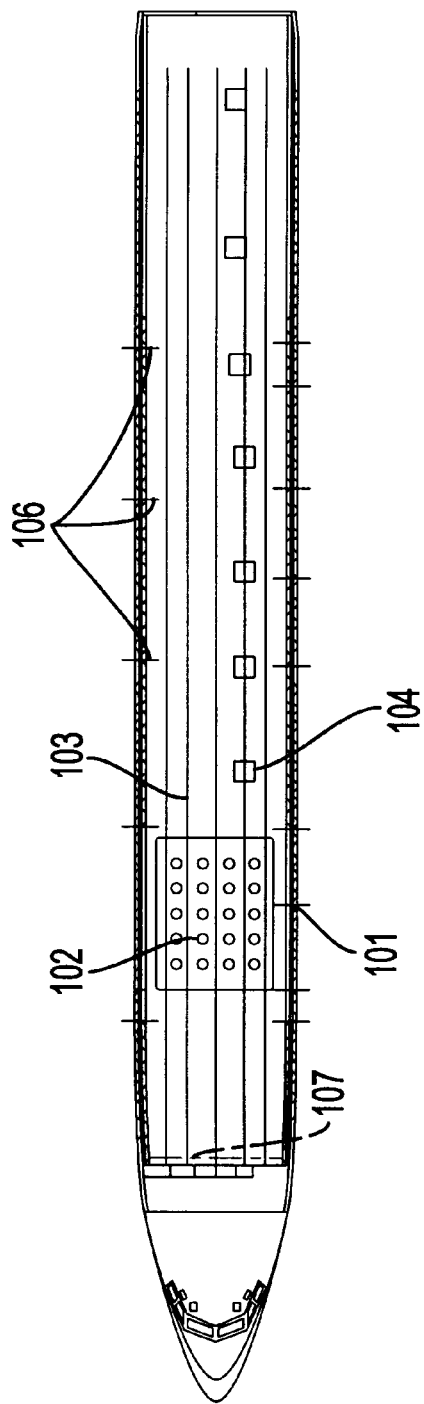
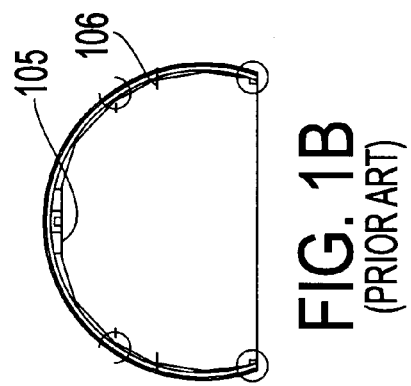
FIG. 1A (PRIOR ART)
FIG. 1B (PRIOR ART)

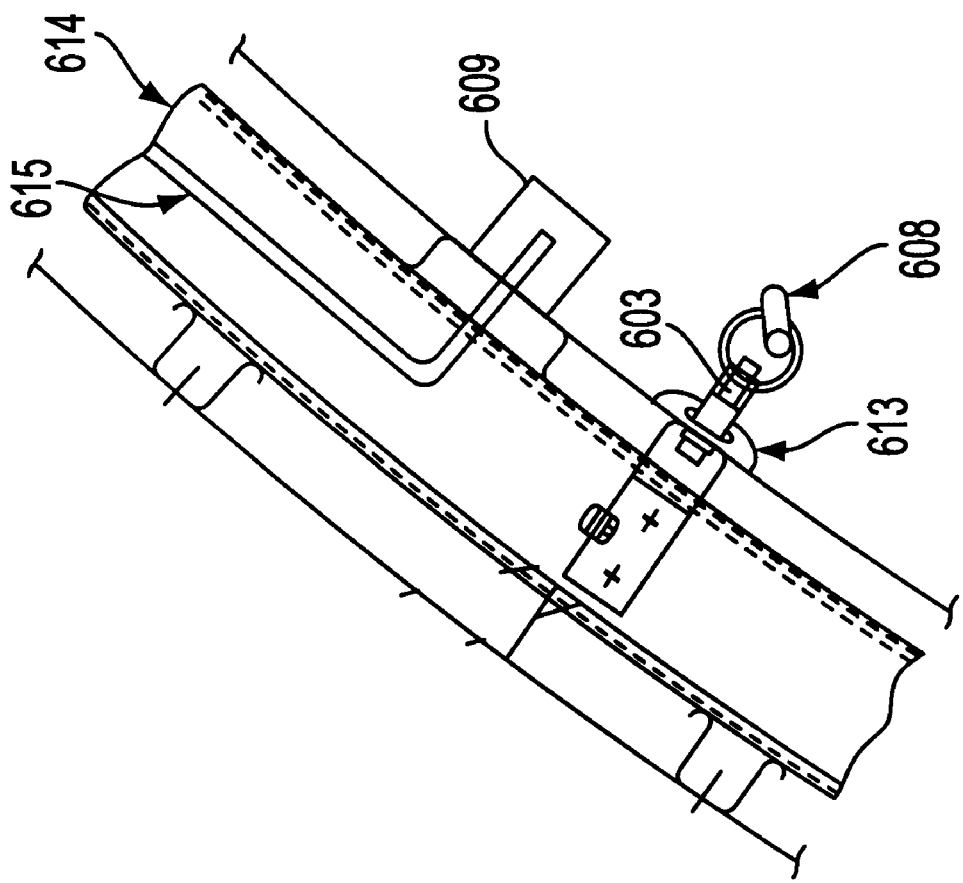

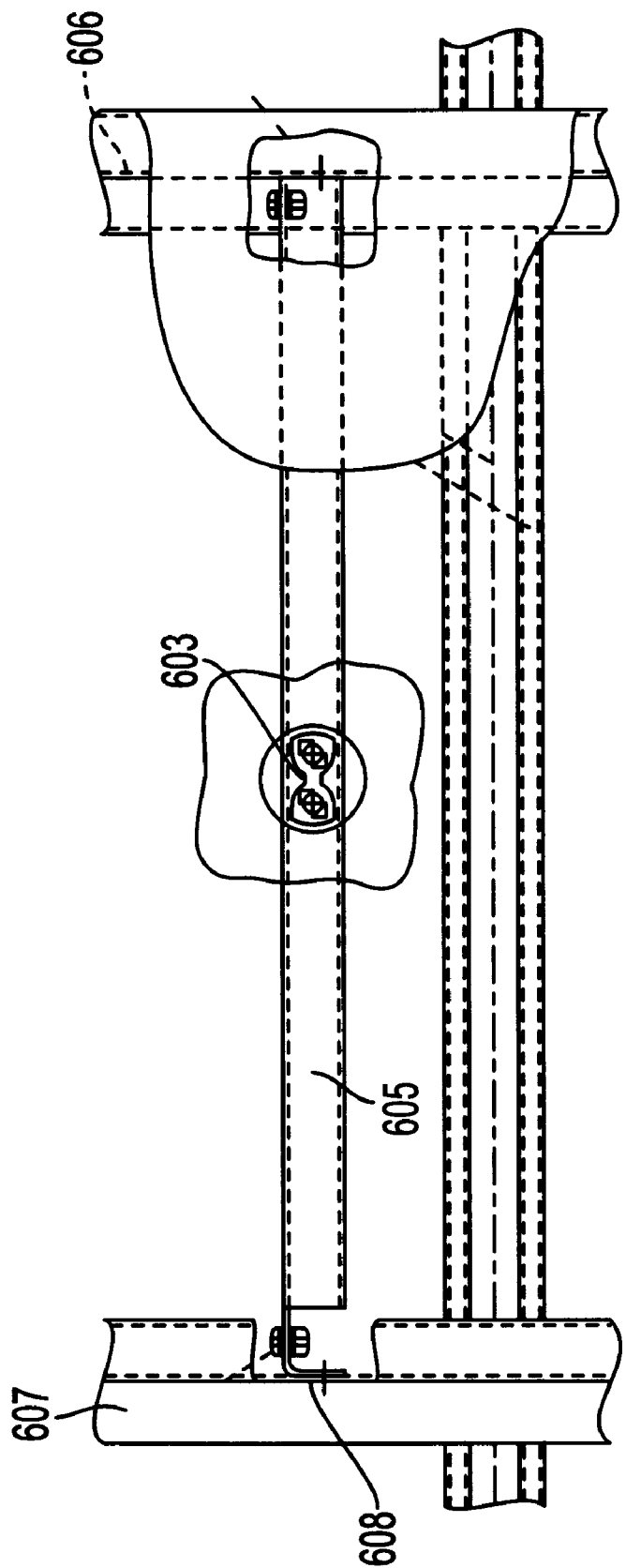

SYSTEM FOR CONVERTING JET AIRCRAFT TO PARABOLIC FLIGHT OPERATION

BACKGROUND OF THE INVENTION

1. Technical Field

The present invention relates to a jet aircraft configuration. More particularly, the present invention provides an improved aircraft which is quickly reconfigurable from a cargo or passenger configuration into one adapted for parabolic flight operations (zero-gravity) for entertainment purposes.

2. Related Information

The National Aeronautics and Space Administration (NASA) has for many years conducted so-called parabolic flights in order to simulate zero-gravity situations. NASA developed a KC-135 jet aircraft specifically adapted for flying such missions. Parabolic flights are used, for example, to train astronauts in realistic outer space scenarios. In a parabolic flight pattern, the aircraft starts at about 28,000 feet and begins a descent using a flight path which creates a zero-gravity condition on the airplane.

The aircraft requires special modifications to support a zero-gravity condition. As one example, hydraulic systems must be modified to prevent hydraulic fluid from "cavitating" during low-gravity periods. These and other modifications are described in a prior art NASA document entitled "KC-135 Modifications Manual", dated Apr. 5, 1982, incorporated herein by reference.

Recently, the concept of using parabolic (zero-gravity) flights for entertainment purposes has been proposed. For example, paying customers would be initially strapped into seats during take-off, and then would be free to float about the cabin during the zero-gravity period, which typically lasts about 30 seconds per dive.

In contrast to the NASA KC-135 modifications, there are many problems associated with providing zero-gravity flights for commercial entertainment purposes. For example, whereas NASA is generally exempted from various safety standards and comfort requirements, a commercial parabolic flight aircraft must meet such requirements. Moreover, using a dedicated aircraft for entertainment purposes is prohibitively expensive. Normal turbojet aircraft operations can be extremely expensive, running on the order of $20,000–$30,000 per day. Because parabolic flights are inherently conducted over short periods of time each day, use of a dedicated aircraft for parabolic flight operations, as done by NASA, is cost prohibitive for entertainment purposes.

In addition, because NASA's parabolic aircraft is flown under public aircraft regulations, NASA is not monitored by the Federal Aviation Administration (FAA) and is not subject to the rigorous inspection and engineering design called out in the Federal Aviation Regulations (FARs). This set of regulations defines requirements that must be met in order to achieve a certificate for operation enabling an individual or organization to hold out to the general public. However, since no FAA specification exists specifically for parabolic flight operation, there are no clear set of design guidelines for providing a commercial passenger aircraft which meets all known FAA regulations for parabolic flights.

SUMMARY OF THE INVENTION

Accordingly, the present invention provides a low-cost method and apparatus for reconfiguring a jet aircraft from a non-parabolic flight configuration (e.g., normal cargo or passenger configuration) to one which specifically supports parabolic flight operations and which complies with all FAA safety regulations. In particular, the present invention provides both mechanical and interior modifications to permit rapid reconfiguration between a cargo configuration and a parabolic flight configuration.

In other words, the present invention permits a dual-use aircraft design which can fly normal cargo missions during the weekday nights and parabolic flights on the weekends and weekday days.

The above and other objects, features and advantages of the present invention will be readily apparent and fully understood from the following detailed description of preferred embodiments, taken in connection with the appended drawings.

BRIEF DESCRIPTION OF THE DRAWINGS

FIG. 1A illustrates a conventional cargo configuration for a jet aircraft such as a Boeing 727.

FIG. 1B shows a cross section of an interior of an aircraft lined with a thin material, commonly known as a gill liner 105.

FIG. 6D is a cross sectional view showing how each wall bracket may be mounted using an anchor plate 613 secured to an existing wall frame 614 of the aircraft.

FIG. 6E is a side view showing one possible mounting detail for wall brackets 603.

DETAILED DESCRIPTION OF THE PREFERRED EMBODIMENTS

Figure 2:
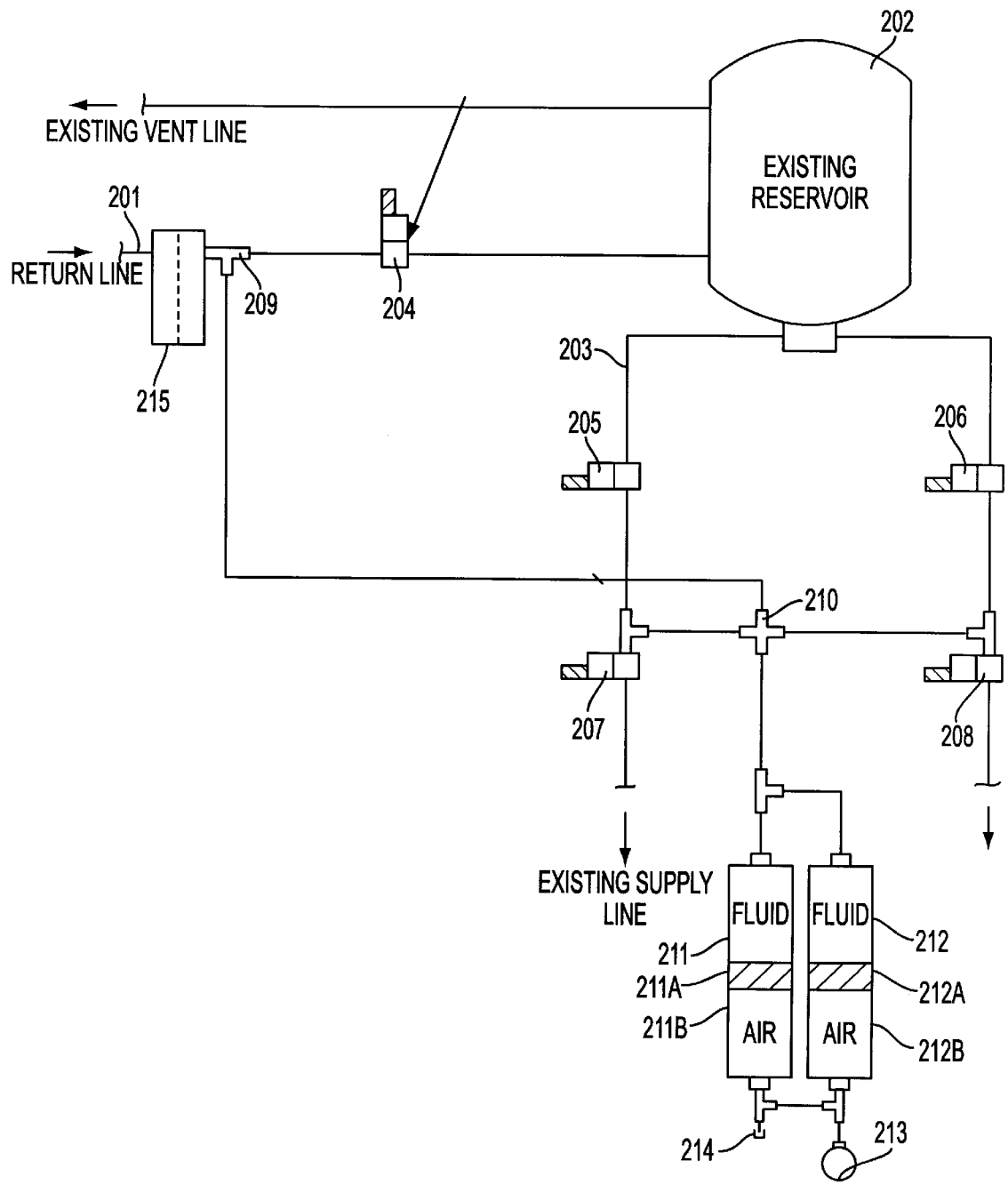
FIG. 2 is a schematic diagram showing various hydraulic system modifications to an aircraft in accordance with the present invention.

The present invention relates to a series of modifications to rapidly convert a cargo aircraft to an aircraft capable of carrying passengers on reduced gravity (or parabolic) flights. In this operational mode, systems have been specifically designed or modified to meet all current FAA FARs. More importantly, this enables the dual use of the aircraft for normal cargo as well as reduced gravity flights. This dual use for the aircraft has a significant impact on the business cost to provide flights for the general public.

FIG. 1A shows a conventional cargo configuration for a large jet aircraft such as a Boeing 727. In this cargo configuration, the seats, overhead compartments, safety equipment, and passenger interior have been removed and the emergency exits have been deactivated. A cargo door 101 is usually installed on either side of the main fuselage for loading and unloading cargo pallets. Just inside the cargo door is a roller mat 102 which is used to align the cargo pallets with the roller tracks 103 in the plane. This mat has multiple rows of ball bearings that aid in translation of the cargo to engage the tracks. The roller tracks run the entire length of the plane. These tracks allow the cargo pallets to be rapidly moved into position and then locked into place during flight. The locking is accomplished by a series of mechanical devices 104 and provides secure structure for safety.

As shown in FIG. 1B, the entire interior of the plane is lined with a thin material, commonly known as a gill liner 105. This thin liner provides a layer of protection to the outside aluminum skin of the aircraft. By FAA FARs it must be made of a material that is self-extinguishing in case of a fire.

Because the crew on a cargo flight only consists of 2 to 3 members located in the forward cockpit of the plane, a smoke detector system is required along the inside of the aircraft cargo area. This is accomplished through multiple air pickup tubes 106 located along the entire inside of the plane. These tubes protrude 1–2 inches into the interior of the aircraft. Air or smoke is transported to one or more centrally located detectors and alarms are sounded if detection is positive.

A 9-g bulkhead 107 is installed just forward of the cargo section and prevents cargo from shifting forward to the cockpit in cases of emergency or crash landings. Since the crew has no frequent reason to be in the aft part of the aircraft (the cargo area), especially for take-off and landing, the rear emergency exits are typically deactivated and the outside demarcation of the exit is removed. In order to convert a cargo plane into a plane capable of carrying passengers, many passenger related systems must be added.

Complete interiors have conventionally been installed into cargo planes to convert such planes into passenger planes (commonly known as "combis"). These planes are specifically designed to carry passengers point to point in typical passenger comfort and services. For this reason, expensive modules have been designed and built which include overhead compartments, seating, carpet, galleys, restrooms, and flooring. These tube-like structures are just the right size to fit inside the plane and are difficult to transport from point to point with out the use of a dedicated aircraft.

The interior modifications of the present invention are quite different from the combi configurations described above. Most important of these differences is the rapid nature of the installation and the ability to ship in advance the entire interior package to any place that a parabolic flight may occur. This allows cities to be booked well in advance of the plane arrival and the plane only taken out of cargo service for a short time, while the plane would have otherwise sat idle waiting for the next cargo flight. This is a significant business advantage, as a plane which is considered 100% utilized on the books can generate extra revenue during the unavoidable down time.

Various aircraft modification of the present invention fall into two general areas: mechanical and interior. In the mechanical modifications, the hydraulic system and a strap-down accelerometer package have been designed to meet both FAA FARs and to allow rapid installation or reconfiguration for normal aircraft operations. The hydraulic system modification is permanently installed in the aircraft and does not interfere with normal cargo systems operations in day-to-day operations. The accelerometer system is designed to be easily removable and installed only during parabolic flights.

The interior modifications are divided into two sections. One set of modifications is permanently installed (Section I) in the aircraft and does not interfere with normal cargo operations, and the other set is a removable kit (Section II) that has been designed to rapidly convert a cargo aircraft to one that will meet all FAA regulations for passengers. This kit must be easy to transport and fulfill all existing FAA FARs for passengers carrying aircraft. The permanently installed interior modifications include modification to the emergency oxygen systems, handrail attach fixtures, parts of the emergency exit lighting, and gill liner. The removable items include removable floor covering, seats, emergency equipment, and parts of the emergency lighting and evacuation systems.

The present invention has been applied to the design of a Boeing 727 jet aircraft. However, it will be appreciated that the inventive principles apply to other aircraft such as Boeing 737 and others.

Section I: Permanently Installed Modifications

A. Hydraulic Systems

In the hydraulic systems of many commercial aircraft, a reservoir or reservoirs are used to supply make-up fluid to the hydraulic pumps to compensate for varying fluid demands of flight control and other hydraulically-operated systems. These reservoirs are sometimes not completely full of hydraulic fluid. To keep the fluid from foaming at the reduced atmospheric pressure at high cruise altitudes (about 35,000 feet above mean sea level) a bleed air line (from the engine bleed air system) is normally installed to maintain an air pressure around 30–45 PSI in the top of the reservoir. While this is sufficient for normal aircraft operations (with positive gravity holding the fluid on the bottom of the reservoir), during parabolic flight, there is a chance that the fluid and bleed air could mix forming a foam that could possibly go into the hydraulic pumps. If that happens, possible pump cavitation (loss of hydraulic output pressure) could occur. If this happened in all pumps, loss of hydraulically boosted flight controls could occur.

While almost every commercial airliner would still have a mechanical cable back-up system (manual reversion), the intent of the design specifications of the Federal Aviation Regulations (FAR's) is to have the manual reversion system used only in the event of multiple independent failures in several hydraulic systems. Therefore, in order to secure FAA approval for routine parabolic flight activities in large, commercial turbine-powered aircraft, it is necessary to devise a system that will prevent foaming of the fluid during parabolic flight operations. This invention with regard to the hydraulic system modifications allows parabolic flight by virtue of a series of valves, tubing, connectors and accumulators in order to bypass returning hydraulic fluid around the main reservoir(s). This concept keeps a closed volume system so that there is no possibility of air mixing with hydraulic fluid and causing foaming.

FIG. 2 is a schematic view of various hydraulic system modifications in accordance with the present invention. As shown in FIG. 2, hydraulic fluid from existing return lines 201 flow through a return filter 215 into an existing hydraulic reservoir 202 to accommodate volume changes in the fluid as hydraulic elements are actuated. Fluid flows from the reservoir 202 to existing pumps through existing supply lines 203.

In contrast to conventional hydraulic systems, new components have been introduced into the system of FIG. 2. In particular, three new valves 204, 205 and 206 are disposed within the path of the hydraulic lines. Valve 204 is disposed between the existing return line 201 and the existing reservoir 202. Valves 205 and 206 are disposed between the existing reservoir 202 and existing shutoff valves 207 and 208. Two new accumulators 211 and 212 are coupled into the system as shown. The accumulators are coupled in parallel to the existing supply lines through a fourway connector 210. The existing return line 201 is connected through a "T" connector 209 to the four-way connector 210. Valves 205, 206 and 207 may be of any type which shut off the flow of hydraulic fluid (e.g., electromagnetically actuated valves).

During normal operation (i.e., non-parabolic flight mode) of the hydraulic system, valves 204, 205 and 206 are all in the open position. This allows normal flow of the hydraulic fluid returning from the hydraulic components (generally flight control system power control units (PCU's) or activators) to hydraulic reservoir 202. From reservoir 202, fluid is supplied through the open valves 205 and 206 through the existing shut-off valves 207 and 208 to the hydraulic pumps (not shown).

In the parabolic flight position, valves 204, 205 and 206 are moved to a closed position, which causes hydraulic fluid returning from the PCU's to be directed into the two accumulators 211 and 212. The function of the accumulators is to provide for volume changes in the system while keeping the fluid and air separated. The accumulators provide this function by using a diaphragm 211A and 212A that keeps the fluid and air from mixing.

Accumulators are used in other aircraft systems such as emergency brakes or emergency thrust reverser operation. The bottom, or gaseous side, of the accumulator has a pre-charge to provide a cushion effect for the diaphragm. Some conventional aircraft use single accumulators further down in the hydraulic system for back-up pressure/fluid, should the normal system malfunction. However, the present invention provides dual accumulators as part of the master hydraulic fluid supply system. Moreover, in contrast to NASA's KC-135 modification, which uses only a single accumulator, control valves 204, 205 and 206 are provided to permit reconfiguration of the system between a normal and a parabolic flight configuration in a fault-tolerant mode using dual accumulators.

The accumulators operate as follows. Hydraulic fluid is present on one side of diaphragms 211A and 212A. A gaseous pre-charge (dry nitrogen) is provided in a lower chamber 211B and 212B of each accumulator. The pre-charge may be provided while the aircraft is on the ground through an air bottle or cart and is pressure matched to the existing reservoir pressure.

The gaseous pre-charge and subsequent pressure in the gaseous portion of the accumulators can be indicated with a pressure gauge 213 which can be mounted near the accumulators. The initial pre-charge in the accumulators is established by injecting gas through a valve 214 and adjusted so that when the normal aircraft hydraulic system is operating, the accumulators are approximately one-half full of hydraulic fluid. When the valves 204, 205 and 206 are placed in the closed (parabolic flight) position, all fluid volume change requirements (by using elements of the hydraulic system) are accommodated by the accumulators. For example, if more fluid is required in the system, hydraulic fluid is expelled from the accumulators into the system with a corresponding decrease in gaseous pressure. Conversely, if fluid needs to be removed from the system, the accumulators will accept the fluid with a corresponding increase in gaseous pressure. Through the use of the dual accumulators and valves, cavitation of the hydraulic fluid during parabolic flight operation is avoided.

The present invention also provides a flight deck mounted switch and indicator lights that positively indicate the configuration of the system. This is accomplished by using valve position signals to illuminate lights (one for each valve) in the flight deck. These lights are controlled by actual valve position, so they positively indicate the valve position. In contrast, the conventional NASA design does not provide any positive feedback of the actual valve position for its accumulator.

To provide redundancy and fail-operational operation (i.e., any single failure does not preclude normal operation), each valve control circuit is powered from a separate aircraft electrical circuit. Moreover, each valve maintains its current position until commanded to change. If the hydraulic valves fail to close when commanded by the flight deck activated switch, the system will continue to operate normally. In this case, parabolic flight will not be conducted and the aircraft will return to base. All valves have closed normally, and after parabolic flight any one of the valves fails to open, the system will again operate normally and allow all normal functions of the hydraulic system to operate. In this case, if the return line valve 204 (placed on the existing return line 201) fails to open, fluid will still be supplied as necessary from the existing reservoir 202 as well as from the accumulators 211 and 212. If either of the supply line valves 205 and 206 fails to open, the lines are connected in parallel and either valve can supply fluid to both engine driven hydraulic pumps due to the four-way connector 210. Further, a dual valve failure can also be tolerated if the one valve that fails to open is the return line valve 204. In this case, there is still an open path from the existing reservoir 202 to the engine driven hydraulic pumps (not shown). Because the invention can sustain any one failure, the system is considered fail-operational for normal flight.

Figure 3A:
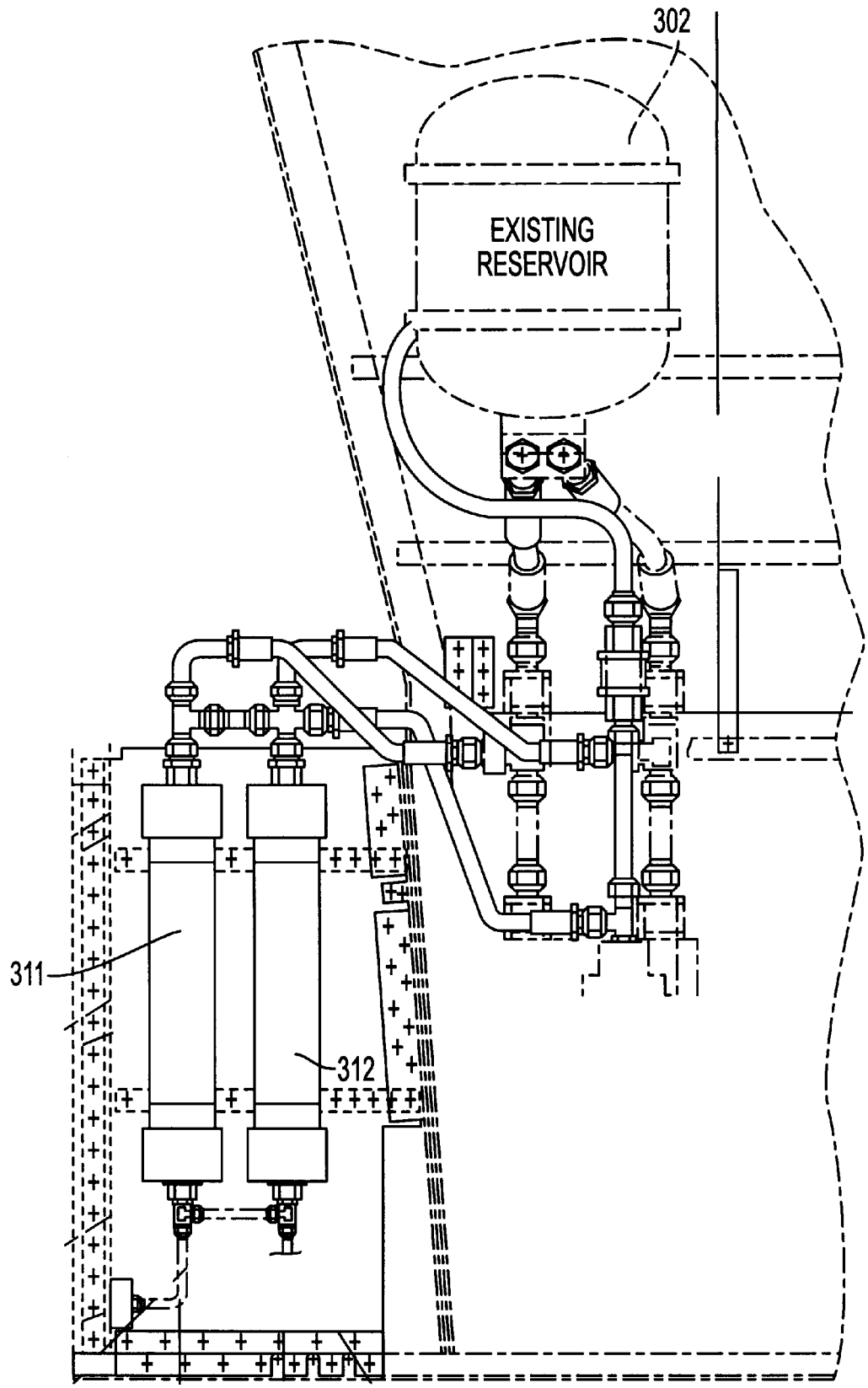
FIG. 3A is a side view of the hydraulic system modifications of FIG. 2.

FIG. 3A is a side view showing how the hydraulic system modifications can be fitted into an existing installation. As shown in FIG. 3A, the existing reservoir 302 is coupled to dual accumulators 311 and 312 through the valves and hose connections described with reference to FIG. 2.

Figure 3B:
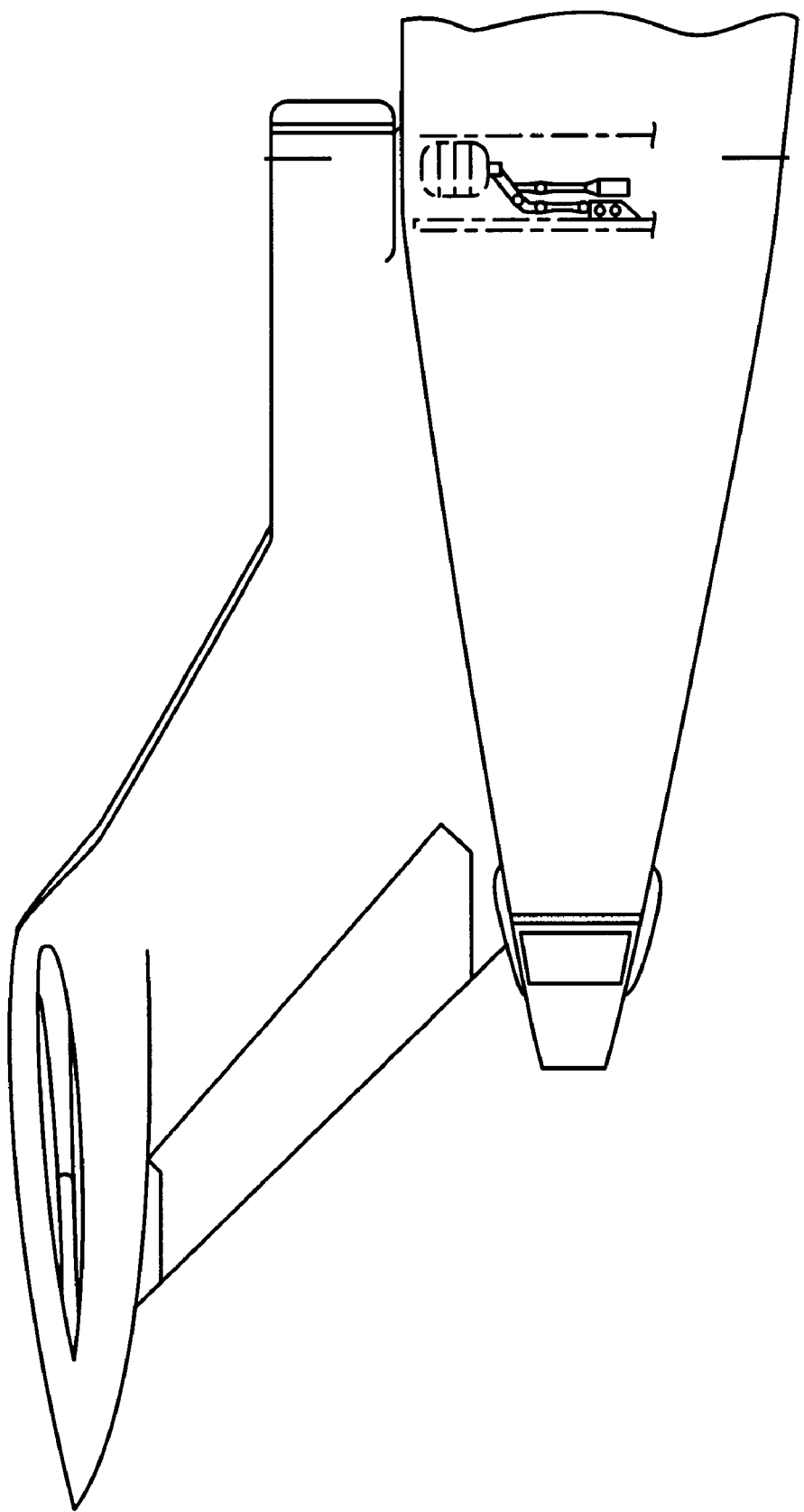
FIG. 3B shows the position of the hydraulic system in the tail section of a Boeing 727.

FIG. 3B shows the position of the hydraulic system in the tail section of a Boeing 727 aircraft.

The closest prior art of which the inventors are aware is the NASA/USAF KC-135 jet aircraft that has been modified to conduct parabolic flights. However, there are many differences between the NASA modification and this invention. For example, as explained above, the NASA design uses only one accumulator and one set of hoses and one valve. The NASA system is thus not fault-tolerant or fail operational. This is in contrast to the present invention, which uses dual accumulators and dual valves. This dual configuration provides the added feature of single fault tolerance and fail-operational capability. Second, the NASA configuration does not provide a positive indication of valve position, whereas embodiments of the present invention incorporate a positive indication of valve position. Thus, safety requirements (which are not a concern in the NASA design) can be achieved.

B. Accelerometer System

In accordance with one aspect of the present invention, an accelerometer system is provided to indicate various parameters of the parabolic flight path. One embodiment of the accelerometer system includes two parts. The first part is a cockpit g-meter and data recorder to measure and record high-g levels during entry and pullout to ensure that the aircraft does not exceed FAA -established limits. This additionally provides a detailed history of the aircraft g-loads to be used during inspection cycles.

The second part is a system of a computer, accelerometer, transducer and a display which guides the pilot through a theoretically perfect parabola based upon altitude, airspeed and aircraft position to predict a perfect parabolic trajectory. The predictive system allows an extra 2–3 seconds of reduced gravity during entry and exit.

Figure 4A:
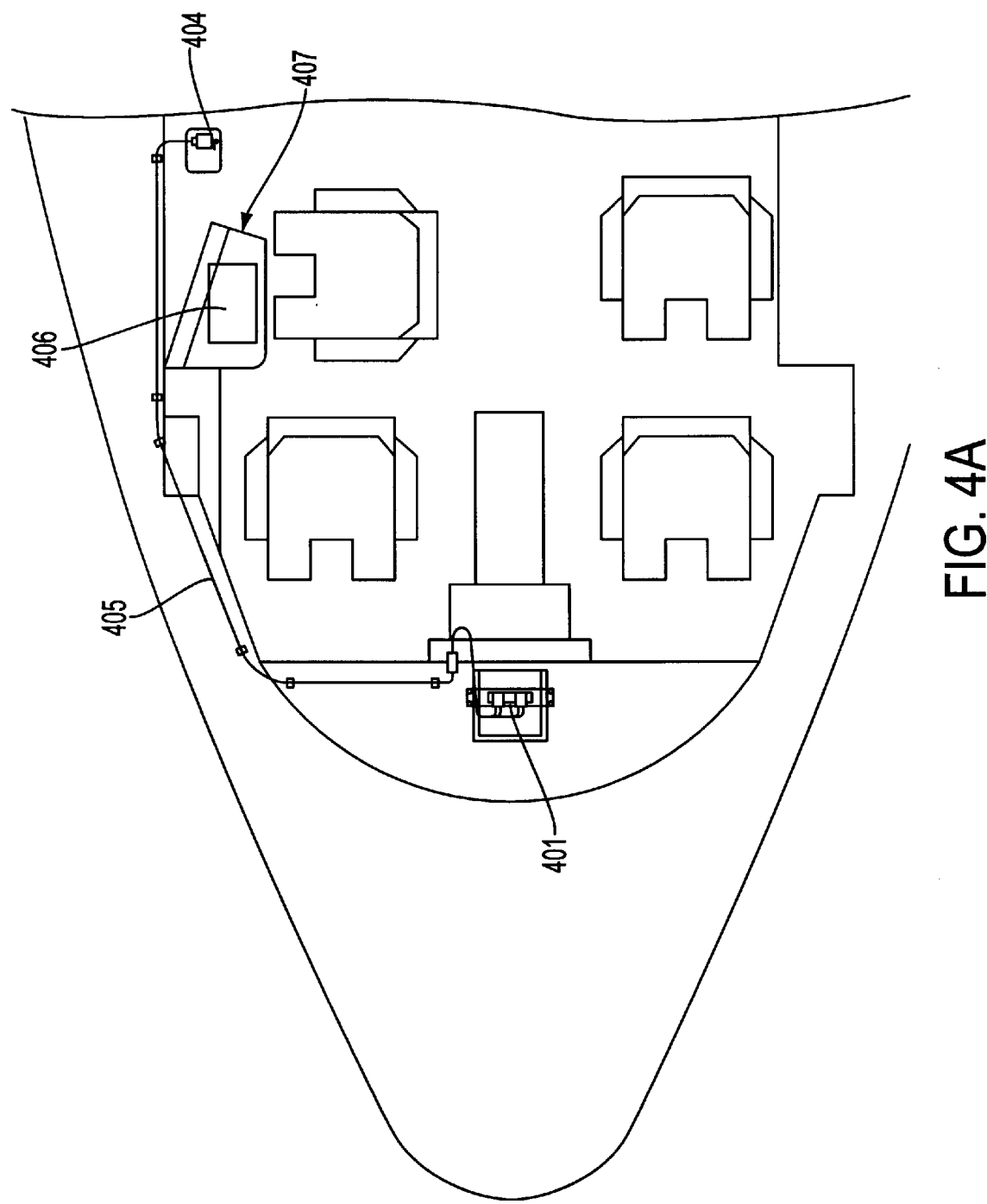
FIG. 4A shows a top view of a cockpit including an accelerometer display device and transducer 401.

FIG. 4A shows a top view of a cockpit including an accelerometer display device 401 including a transducer. The accelerometer device 401 is coupled to a power supply unit 404 through a cable 405. The accelerometer device may comprise, for example, a GS95-A accelerometer manufactured by EZE Instruments, Inc. (Salt Lake City, Utah).

Figure 4B:
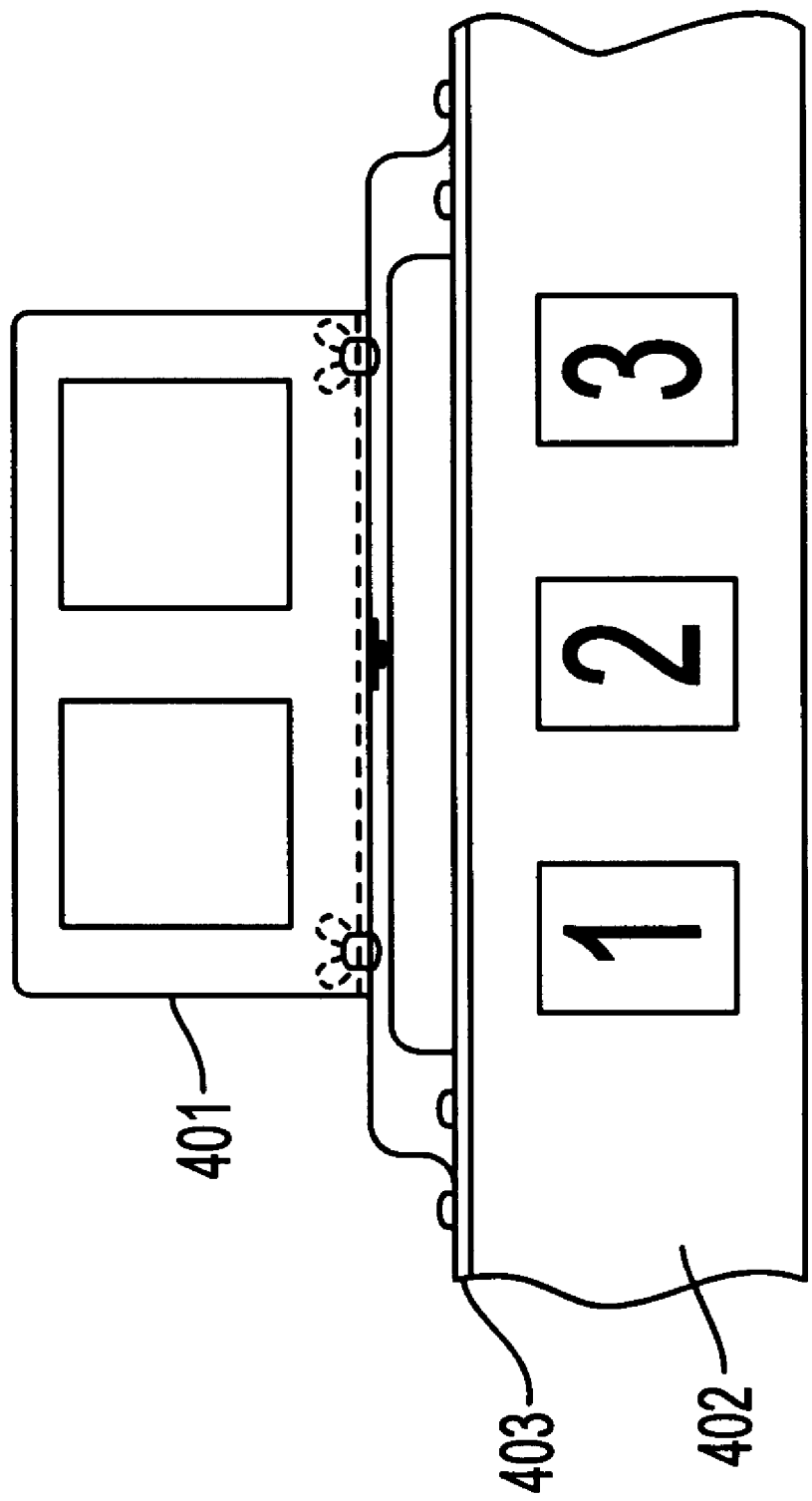
FIG. 4B shows one possible mounting arrangement for the accelerometer device 401.

FIG. 4B shows how the accelerometer device 401 can be mounted directly on an existing glare shield 403 which is directly above existing instruments 402. In one embodiment, the accelerometer device 401 may be removably mounted to the glare shield 403 using brackets and wing nuts.

In the accelerometer system, an acceleration measurement device is coupled to a pair of cockpit mounted indicators which aid the pilots in flying a parabolic trajectory. These two indicators, like the indicators used by NASA aircraft, indicate a coarse and fine scale. The pilots can first push the plane to the desired gravity level using the coarse scale, and then fine tune the trajectory using the fine scale.

In addition to the coarse and fine scales found in the NASA aircraft, the present invention includes an audible alert which warns the pilot of high-G limits when entering and exiting the parabolic maneuver. This feature is provided by the aforementioned EZE part.

One embodiment of the present invention also provides an additional display device 406 which shows a calculated best parabola based on aircraft parameters such as speed, altitude, pitch, and turbulence, all derived from the acceleration measurement. The predictive display device 406 may be removably mounted at the flight engineer's station 407 and coupled to accelerometer device 401 through a data cable which may form part of cable 405. Alternatively, predictive display device 406 may be combined with accelerometer device 401 and removably mounted on the glare shield 403.

Predictive display device 406 receives instantaneous acceleration measurements from accelerometer device 401 and generates a visual indicator of flight inputs (e.g., pitch controls for the pilot). In one embodiment, predictive display device 406 may be implemented using a notebook computer programmed with computer software which performs calculations based on the instantaneous acceleration and generates the visual display.

The modified KC-135 NASA design does not use such a display in its aircraft, thus requiring the pilots to perform much more in-flight training to effectively execute the parabolic maneuver. Predictive display device 406 allows the pilots to fly a much more precise maneuver because it is calculated from a theoretically best case flight trajectory. This will, most importantly, lessen the time for entry and exit of the maneuver, which in turn adds valuable seconds of reduced gravity to the beginning and end of the parabola. In addition, specific aircraft responses can be measured and added to the calculated parabolic maneuver to correct for aircraft specific performance. In this way, a perfect parabola can be tuned to a specific aircraft and flying conditions.

The NASA accelerometer display that has been in place during the last 30 years is driven directly off the accelerometer. Acceleration levels are measured and fed to a display which shows a coarse and fine g-level. The pilot can push the aircraft towards zero-g using the coarse meter, and below a certain threshold, make fine corrections using the more accurate display. This system is still crude in that it relies solely on the skill of the pilot to fly the best parabolas. Whereas the NASA approach is to fly to the raw accelerometer data as displayed in the cockpit, pilots using one embodiment of the present invention can fly to a predicted, or best fit, display.

Figure 5A:
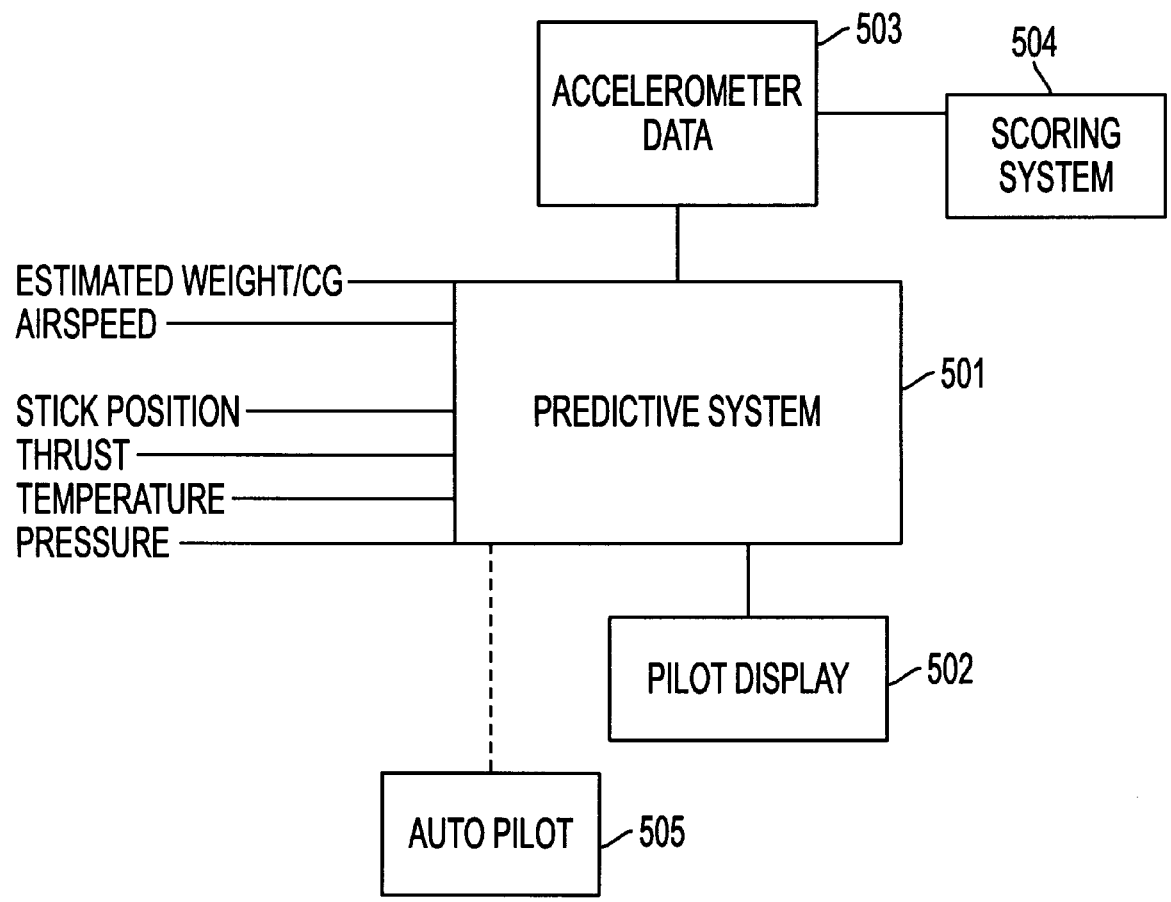
FIG. 5A shows a predictive display system which helps a pilot achieve an ideal parabolic flight arc.

FIG. 5A shows one design for a predictive display system according to various aspects of the present invention. As shown in FIG. 5A, raw accelerometer data 503 is fed from the remotely mounted accelerometer head to a computer containing algorithms for a predictive system. The predictive system receives sensor values such as pressure, thrust level, airspeed, stick position, pressure and temperature and performs linear and non-linear calculations to predict the proper pilot response for the next few seconds. These values can be updated approximately 30 times per second and model the response of the plane and the pilot to different conditions.

The model values generated indicate to the pilot what actions will maximize the time and quality of the zero-g portion of each flight arc. For example, an indicator can be included for each item the pilot can control: thrust, pitch, roll and yaw. Additionally, software in the system can record how well the pilot follows the directions by tracking the difference in his actions and in the expected reactions for a perfect zero-g arc. The algorithms can use conventional multiple linear regression and other non-linear methods, such as neural networks or fuzzy logic, to predict the proper response values, to notify the pilot of the proper actions to take, and to rate the pilot's score verses the ideal model on individual arcs. As more data is gathered on a particular aircraft, or pilot, the predictive system will be better able to guide the trajectory.

The output from the predictive system can be fed into a display for the pilot. The pilot superimposes the predictive symbol on a pilot display 502 with the actual symbol in order to guide the aircraft through the best fit trajectory. The suggested action for the pilot to take will use a symbol system similar to what is used commonly in instrument landing systems. In a simple example, the pilot tries to center two concentric circles in side one another. Unlike the case of flying to raw data, a predictive system includes data such as trend and how well the pilot has performed his last corrections to more accurately adjust the aircraft's flight path. In this way, the pilot need only be concerned with flying the indicator to a desired location, but this location will have predictive corrections based on previous pilot and aircraft performance metrics.

Figure 5B:
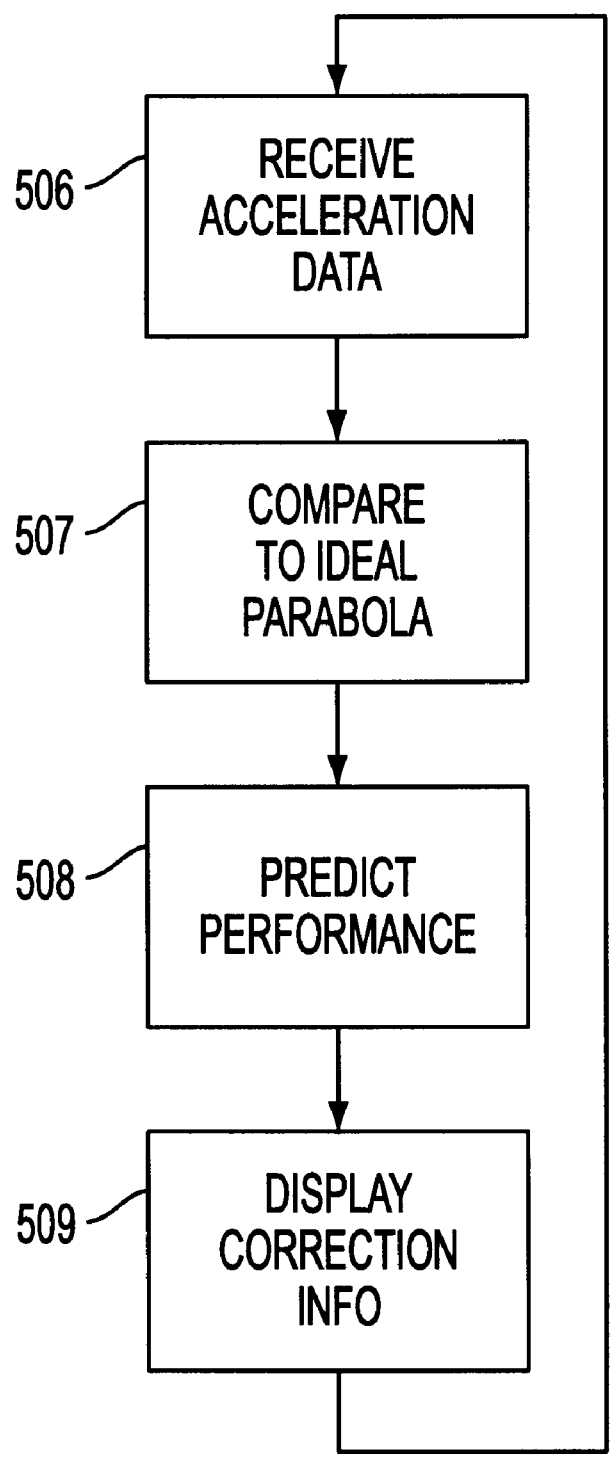
FIG. 5B is a flow chart showing how acceleration data can be used to display correction information for a pilot.

FIG. 5B is a flow chart showing how acceleration data can be used to display correction information for a pilot. In summary, instantaneous acceleration data is received in step 506 from the accelerometer. This data is compared in step 507 to an ideal parabola, and the performance is predicted in step 508. In step 509, correction information is displayed to the pilot.

Once the parabola is completed, a score is ascribed to the parabola based on a database of all parabolas. In this way comparisons can be made of how well the aircraft is achieving the desired reduced gravity levels. To score, a data point is set once the aircraft acceleration drops below 0.25 g and then again after going below 0.15 g. A line can be fit to these two points and extended down to 0 g level to describe the point at which the parabola starts. A similar line is constructed on the parabola exit to define where the parabola ends. Using the start and stop data points, a score can be generated on how well the pilot achieved the desired reduced gravity level for the period of time between the start and stop points of the parabola. This root mean square value around 0 g is used as a basis to compare one parabola objectively to the rest. By feeding a score, the pilot will know at the completion of the parabola, how well he did.

In another embodiment, as shown with the dashed line in FIG. 5A, the output of the data may be fed directly into the aircraft's auto pilot system. In this way the pilot may be able to maintain the ability to abort the parabola at any moment, but the autopilot could make corrections much more precise than with human control.

The accelerometer displays and predictive system may be removable for normal cargo operation.

C. Hand Hold Strap Attachments

Figure 6A:
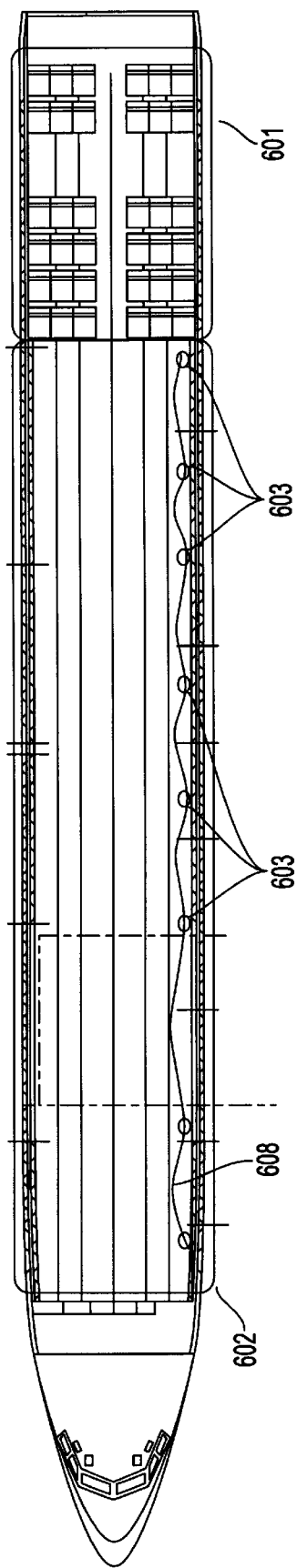
FIG. 6A shows an aircraft interior configuration including a seating area 601 and a floating or "play" area 602 in accordance with the invention.

In accordance with the present invention, the aircraft cabin can be partitioned into a seating area and a "floating area" in which passengers float during zero-gravity conditions. FIG. 6A shows such a configuration including a seating area 601 and a floating or "play" area 602. In order to increase the comfort of the passengers who are unfamiliar with weightlessness, and in order to allow the onboard crew (trainers) to obtain an attachment point from which they can handle the passengers, a set of handrails and restraint systems may be distributed throughout the floating area of the aircraft.

The prior art NASA KC-135 design includes a floating area and a seating area. However, as described in more detail below, one aspect of the present invention provides a removable seating area and removable padded pallets which facilitate rapid conversion from a cargo configuration to a zero-gravity configuration. Moreover, in contrast to the NASA design, the present invention provides floor-mounted brackets which increases the ability of passengers to secure themselves.

The design handrail and restraint system is composed of two parts. A set of attachment brackets 603 is permanently installed along the wall of the aircraft through a securing bolt into the rib of the aircraft. From these various attachment points, a taught rope 608 is strung. The second part is a second set of attachment brackets permanently installed along the floor of the aircraft near the junction of the wall and the floor which may be used to string a second rope or a set of seat belts.

Figure 6C:
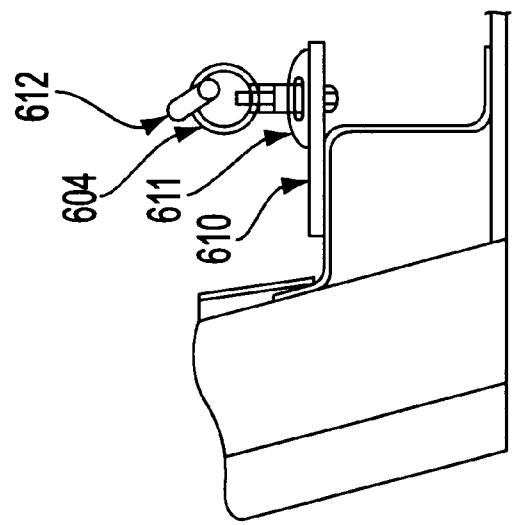
FIG. 6C is a detail view showing how each floor bracket may be mounted to an existing floor guide 610 using an anchor plate 611 and a single stud 604 to attach a hand-hold assembly or rope 612.
Figure 6B:
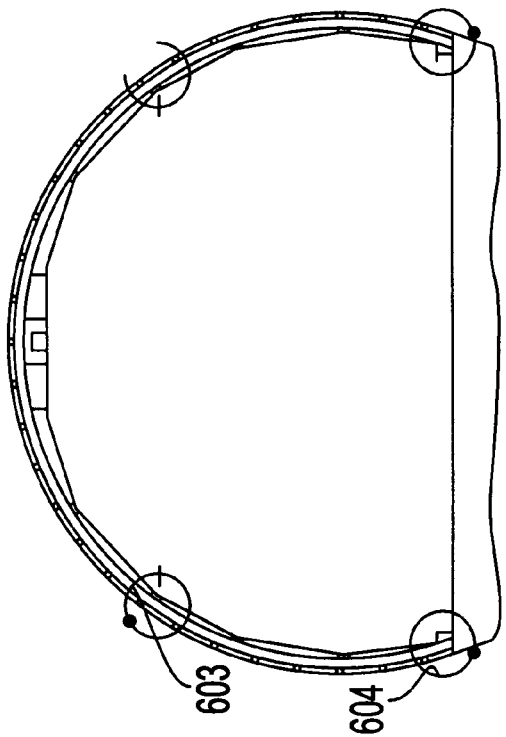
FIG. 6B is a cross sectional view showing a plurality of permanently installed wall brackets 603 which run along the length of the aircraft cabin.

FIG. 6B is a cross sectional view of the cabin showing a plurality of permanently installed wall brackets 603 which run along the length of the aircraft and are positioned approximately five feet above the floor. These brackets may be spaced apart so that approximately 10 brackets are provided on each side of the play area. Similarly, a plurality of permanently installed floor brackets 604 run along the length of the aircraft and are positioned near the junction of the wall the floor.

FIG. 6C shows details of how each floor bracket may be mounted to an existing floor guide 610 using an anchor plate 611 and a single stud 604 to attach the hand-hold assembly or rope 612.

FIG. 6D is a cross sectional view showing how each wall bracket 603 may be mounted using an anchor plate 613 secured to an existing wall frame 614 of the aircraft. The attachment hardware for the rope and belts is permanently installed, while the rope and belts may be removable. Existing smoke detector tubes 615 protrude through the frame 614 into the cabin.

FIG. 6E is a side view showing one possible mounting detail for wall brackets 603. In particular, a mounting bracket 605 is secured between frame ribs 606 and 607, and wall bracket 603 is secured to a center point of the mounting bracket 605. The upper hand-hold uses an additional angle bracket 608 which mounts under the existing gill liner between adjacent aluminum frames of the aircraft. Attached to the angle bracket is the same configuration of anchor plates and single studs used in the floor assembly. This configuration provides added strength.

As described previously, the smoke detection system utilized during the cargo operation mode, requires air pickup tubes along the entire interior of the aircraft. Additionally, it is advantageous for the passengers to have hand-holds along the ceiling and the floor of the aircraft to steady themselves during the reduced gravity phase of the flights. The smoke detector tubes protrude 1–2 inches from the gill liner and must be protected from damage and avoid personal injury of the passengers during the parabolic mode of operation. In order to protect the smoke detector tubes, foam assembly caps 609 (FIG. 6D) can be placed over each tube. This prevents floating passengers from damaging the tubes or becoming injured.

D. Dual-Configuration Gill Liner

Conventional cargo aircraft include a lining called a "gill liner" which is a material that covers the metallic understructure (the rib structures) of the aircraft. This gill liner also covers the insulating material between the passenger compartment and the skin of the aircraft. The NASA KC-135 design also includes such a gill liner.

There are two different conflicting sets of FAA requirements that interior gill liner material must meet depending upon the use of the aircraft. One set of FAR requirements is for cargo operations, and a different set of requirements is for passenger interiors. The typical cargo gill liner is made of a durable, semi-rigid material and is used to line the inside of the aluminum fuselage. Since it is designed for cargo operation, it does not typically meet the FAR specifications for passenger operation.

Normal cargo gill liner material is designed to be inflammable, but incorporates fire suppressants, which are released when heated to help extinguish the fire. This is contrary to the design of passenger interiors which must not release toxic (fire suppressant) materials when heated in a fire. Additionally, most passenger configurations will not meet the durability requirements when using the plane in a cargo configuration. Thus, aircraft are conventionally equipped either with a gill liner which meets cargo requirements (i.e., fire suppressing but releases toxic gases) or passenger requirements (i.e., does not release toxic gasses but is not durable enough for cargo uses). Consequently, aircraft are not conventionally certified for use as both a cargo aircraft and for passenger use.

In contrast to the NASA design, and also in contrast to conventional cargo aircraft, the present invention includes a gill liner material that will permit both cargo and passenger operation and passes the requirements set out in part 25.853 of the FARs. In particular, one gill liner which may be used is the MCGill Corporation's 1367A material which can be permanently installed on the aircraft walls and ceiling. Use of such a gill liner permanently installed in the aircraft permits the aircraft to be rapidly configured to either a cargo configuration or a zero-gravity passenger configuration. This will not in any way affect the ability of the aircraft to maintain its cargo certificate.

E. Emergency Lighting and Passenger Information

In accordance with the present invention, conventional emergency lighting systems are modified to simultaneously meet FARs for passenger operations without interfering with cargo operations. FAA requirements dictate that passenger aircraft include lighting which shows a path to exits in the aircraft. Cargo aircraft, however, have no such lighting requirements. Similarly, NASA is not required to install such lighting and none is present in its modified KC-135 aircraft.

Figure 7:
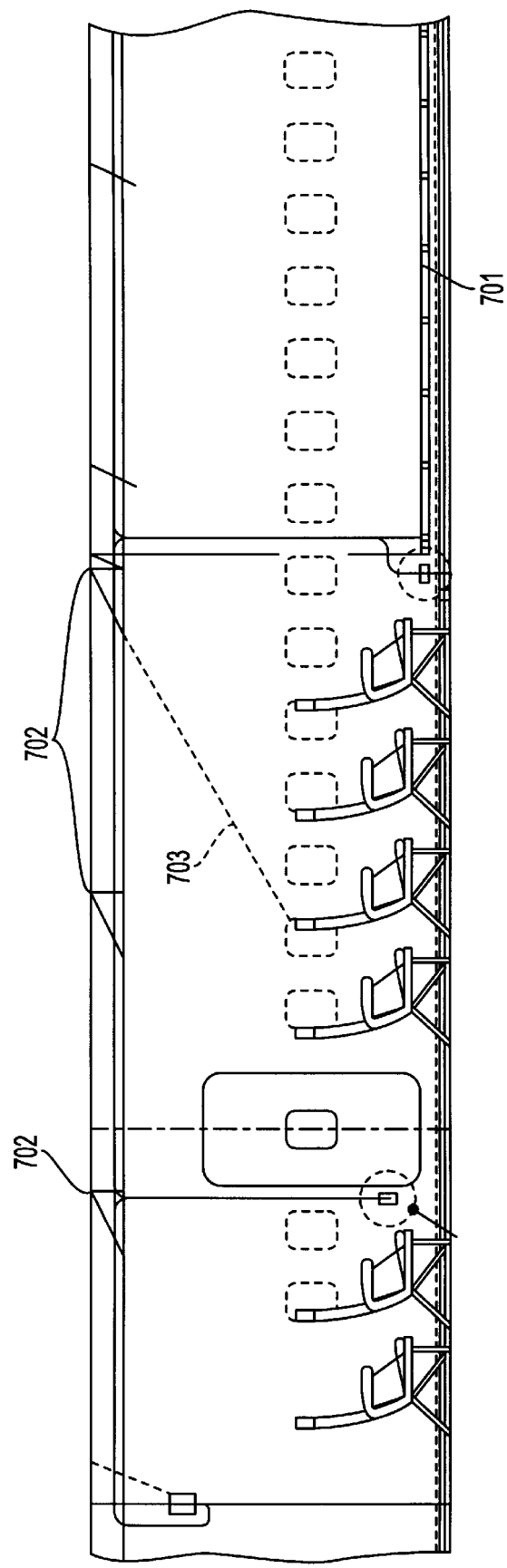
FIG. 7 shows a modified emergency lighting system including track lighting 701 along the side walls of the cabin and recessed information lights 702 in the ceiling.

FIG. 7 shows a modified emergency lighting system according to one aspect of the present invention. In particular, instead of placing track lighting along the floor in passenger aisles of the aircraft, the present invention incorporates track lighting 701 along the side walls of the aircraft. Such track lighting may be provided only in the play area or may extend along the entire length of the fuselage. If the wall tracking lighting stops at the seating area, conventional track lighting may be provided on the floor of the seating area. Providing track lighting along the side walls of the aircraft cabin thus allows the aircraft to comply with FAA safety requirements without interfering with cargo operations.

Additionally, passenger information signs 702 are added to the ceiling of the aircraft. These signs are recessed into the ceiling so that they do not interfere with normal cargo operations. As one example, these signs may comprise a transparent section which is flush with the ceiling, and an angled back portion which displays lighted information above the transparent section in order to be visible along a line of sight 703 of seated passengers. This is in contrast to conventional passenger aircraft, which locate such signs either underneath the overhead passenger bins (nonexistent in the present design) or hanging down from a ceiling area, thus obstructing part of the cabin volume which might interfere with cargo operations.

F. Oxygen System

The FAA requires that all passenger aircraft have an automatically-deployed oxygen system for passengers in case of loss cabin of pressure. Cargo aircraft have no such requirement and thus no oxygen systems are typically provided in the cargo section of the aircraft. In the NASA aircraft, Personal Breathing Units (PBU) are available in the seat-backs for passenger use. These do not meet the FAA requirement that the system must be automatically deployed when needed. In a common commercial aircraft, automatically deployed oxygen systems are normally located as part of the overhead bins or are available mounted in the seat backs. When conducting parabolic flights, it is preferred to fly without the overhead bins as they restrict the volume of the cabin and would be difficult to install and remove for cargo operations.

In accordance with one aspect of the present invention, a modified oxygen drop box is mounted in the ceiling of the aircraft instead of overhead compartments or seat backs. In contrast to conventional oxygen units located in the overhead passenger bins of conventional commercial aircraft, in the present invention oxygen drop boxes are flush mounted into the ceiling between frame ribs of the aircraft and include elongated mask support strings which permit the oxygen masks to be used from the higher ceiling position in the plane.

Figure 8:
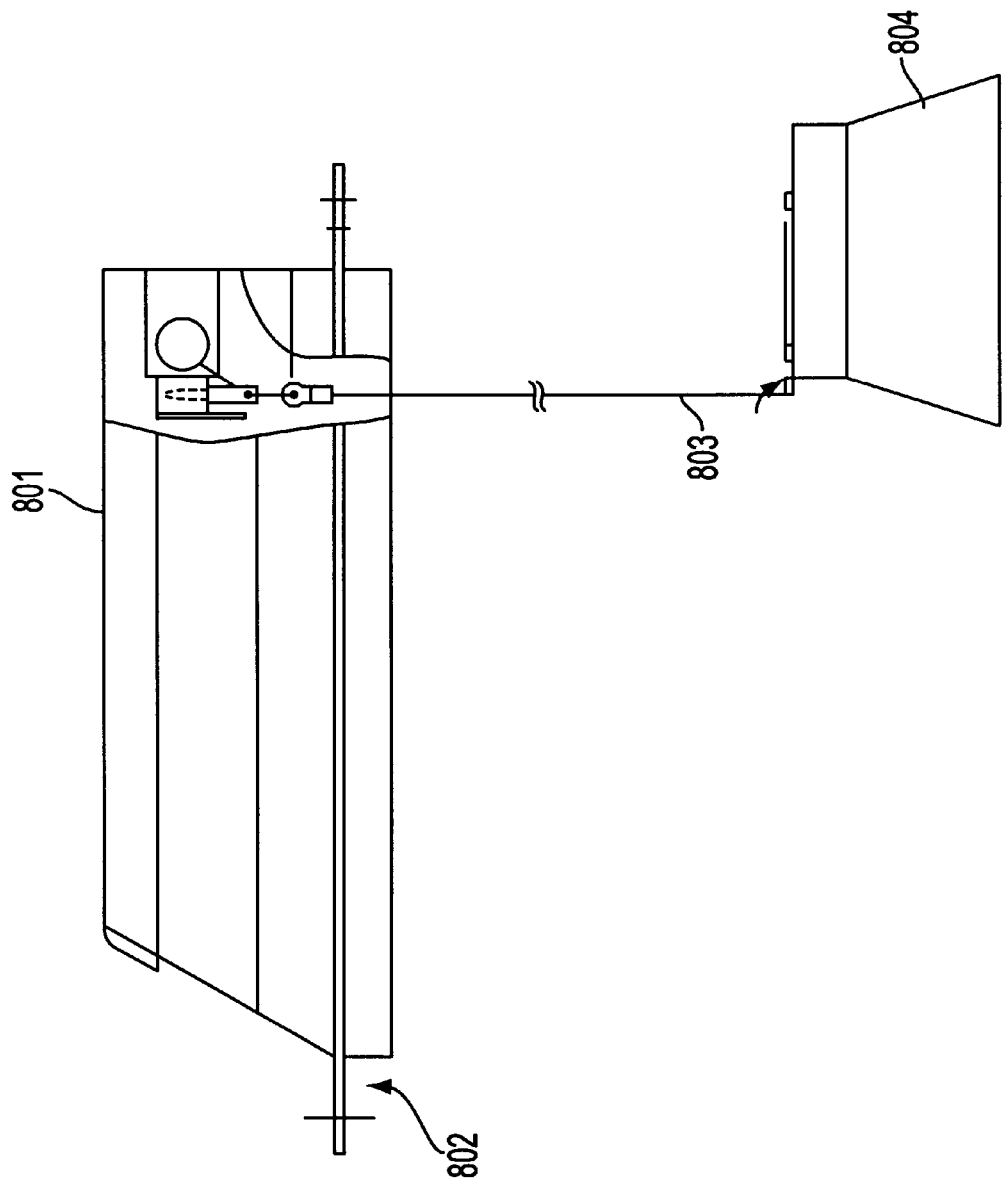
FIG. 8 shows a modified emergency oxygen system including elongated mask supports and hoses.

FIG. 8 shows an oxygen delivery unit 801 which is flush mounted into the ceiling of the aircraft 802. The oxygen delivery unit 801 includes an elongated mask support string 803 which allows each oxygen mask to drop down to seats in the passenger area. As is conventional, pulling on the mask support string 803 opens a valve which triggers the flow of oxygen to the mask 804. In particular, a length of 25 inches (versus a conventional length of 12 inches) may be used as the elongated length of the mask support string. It may also be necessary to lengthen the oxygen supply line to reach from the ceiling of the aircraft to passengers seated in the seating area. Moreover, in contrast to conventional aircraft which normally run oxygen delivery lines down the walls of the aircraft, in the present invention a single oxygen delivery line may be run down the center ceiling of the aircraft, and branched out over the seating area.

Using the inventive design, the oxygen delivery units may be permanently installed even during the cargo operations and not interfere with loading and unloading of cargo.

Section II: Removable Modifications

Some interior modifications are designed to be removed during the cargo operational mode. These removable systems include: a floor system, passenger seats, handhold straps, emergency equipment, certain emergency exit lighting, and a control yoke.

A. Padded Flooring & Seating

In accordance with one embodiment of the present invention, portions of the padded play area and the passenger seating area may be mounted on removable pallets which can be quickly inserted or removed from the cargo aircraft. In another embodiment, foam padding may instead be removably mounted directly to the aircraft floor through the use of temporary attaching means such as Velcro. In yet a third embodiment, equipment pallets such as movie set equipment may be removably installed in the aircraft to permit filming of movies and the like.

Figure 9:
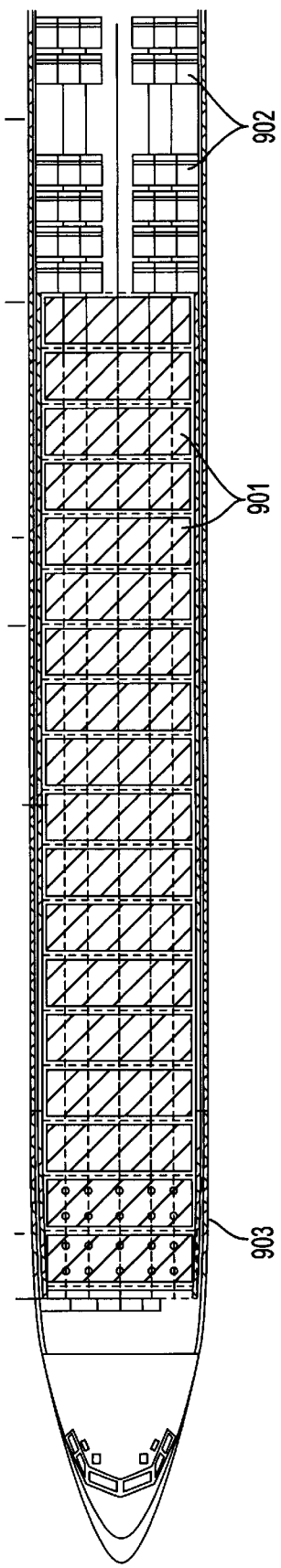
FIG. 9 shows one possible configuration for removable pallets which includes seats and foam padding mounted on cargo pallets allowing for the rapid conversion of the interior configuration from a cargo aircraft into a parabolic flight aircraft.

FIG. 9 shows one possible configuration for the palletized embodiment which includes seats and foam padding mounted on cargo pallets allowing for the rapid conversion of the interior configuration from a cargo aircraft into a parabolic flight aircraft. A plurality of cargo pallets 901 are mounted along existing tracks 103 (see FIG. 1). The pallets are conventional except that they are covered with foam padding to facilitate passenger comfort and safety during zero-gravity operations. Although the NASA modified KC-135 design includes foam padding, the NASA padding is not removable because the NASA plane has no requirement to perform dual-purpose missions.

A system of foam, adhesive and laminate can be attached to a standard pallet via an easily removable method such as Velcro. This allows the foam to be rapidly mounted in and/or removed from a cargo aircraft. The materials used should provide the necessary safety protection and the ability to pass all materials tests as set out by the FAA FAR part 25.853.

The palletized foam padding area permits passengers to freely float throughout the area of the aircraft with no seats.

During the pull out of the parabola and the resultant high-g forces, the passengers will be protected from the hard surface of the floor by this padding. In one variation, the padding consists of three materials, specifically chosen to meet all FAA FARs. Since no padding of this nature has ever been approved by the FAA for flight, it represents an original combination of materials.

Figure 10:
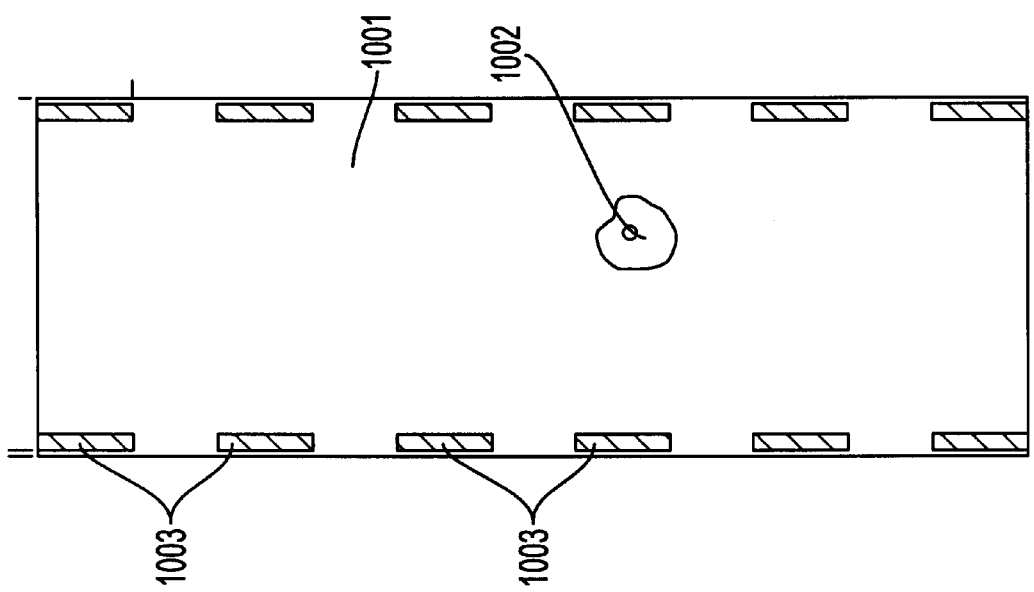
FIG. 10 shows one possible pad configuration for securing foam padding to rigid pallets or directly to the aircraft floor.

FIG. 10 shows one possible pad configuration for securing foam padding to rigid pallets or directly to the aircraft floor. As shown in FIG. 10, a durable laminate surface such as naugahyde 1001 is attached by an adhesive to foam padding 1002 underneath. A plurality of adhesive securing points 1003 such as Velcro may be attached to the pad to permit the pad to be secured. The laminate material must be durable enough to withstand people walking on the surface, while being soft enough to provide the required safety and comfort of passengers.

In one embodiment, a Naugahyde laminate covering (Uniroyal, Mishawaka, Ind.) was bonded to an Ensolite Type ALC 1½ (Uniroyal, Mishawaka, Ind.) foam base using 3M fastbond Contact adhesive (3M Industrial Tape and Specialties Division, St. Paul, Minn.). The Naugahyde can be glued to the top of the foam pad and around the sides to a 3 inch overlap on the foam pad bottom. This securely fastens the Naugahyde to all sides without the need to cover the entire underside of the foam pad. The pads lay in the aircraft from side to side and span the entire width of the aircraft. A set of Naugahyde strips are fastened to the foam pads using Velcro to cover the seams between the adjoining pads.

Conventional passenger seats 902 may also be installed on removable cargo pallets. Alternatively, the seats may be mounted directly to the floor of the aircraft. These seats can be attached using either standard seat tracks, which are attached to the pallet, or they may be attached directly to the floor.

During the take off and landing of the parabolic aircraft, all of the passengers are seated in seats where they can be properly restrained and in which they can get access to oxygen in case of an emergency. The number of seats in the aircraft can vary, typically from one row of six seats (6 total) to six rows of six seats (36 total). These seats can either be mounted to one or more pallets or directly to the aircraft floor. In one embodiment the seats are mounted onto the pallet prior to being put into the airplane and then this pallet with seats are introduced into the aircraft by the pallet handling system and slid into place. Alternatively the seats can be individually loaded into the aircraft and attached to a set of seat tracks which are mounted on the floor below the cargo handling rail system.

In a third embodiment, research equipment or such structures as movie sets may need to be positioned, fixed or mounted onto the aircraft floor. A plurality of pallets can be provided having a standard bolt pattern on the pallet to which various pieces of equipment can be mounted. Because of this standardization of the pallet system, the entire floor system can be shipped to the customer and set up. Research equipment and movie sets can be designed and attached to the floor system containing a pre-defined mounting hole pattern, and the scenes can be rehearsed before committing to the expense of flights. These pallets can be mounted in the area just forward of the seating and be the same size of a standard shipping pallet for a particular cargo aircraft configuration. The pallets span the width of the plane, but are small enough to be loaded through the cargo door. Once loaded the pallets engage with the roller tracks and are moved toward the forward and aft sections of the plane to be locked down in place. The pallets, when all are installed, form a base, or subfloor, which the equipment and seating can be securely fastened. Referring again to FIG. 9, one pallet 903 is configured with a predefined bolt pattern according to this approach.

In one embodiment using a cargo configured aircraft, the padded floor covering and seats are mounted on a pallet system which allows the flooring to be rapidly installed into an aircraft and locked into place with standard cargo restraining system. In the case of an aircraft without roller mounts, the plates contain a designed pin system, which allows them to be attached to the existing seat tracks on the aircraft floor. This dual use design provides a greater amount of flexibility than the permanently installed padding used in NASA aircraft and additionally the materials chosen allows for both long-term durability and compliance with the FAA FARs for aircraft interiors.

These pallets conform to the standard track size and can be used to replace a standard shipping pallet. There are three basic designs for these pallets. In one configuration a plurality of mounting holes with a regular pattern has been incorporated to allow for mounting various experiments and sets for use during the reduced gravity flights. Other floor pallets can be covered with a permanently attached, or removable, padding for open area space during the flights. The final set of pallets have been designed to accept seats for passengers.

When unloaded, these pallets can be conveniently stacked for storage or transportation to the next flight location. In the case of movie production, the floor pallets 903 can be shipped to a location, such as a sound stage, months in advance of the actual filming and used to construct the set.

Figure 11:
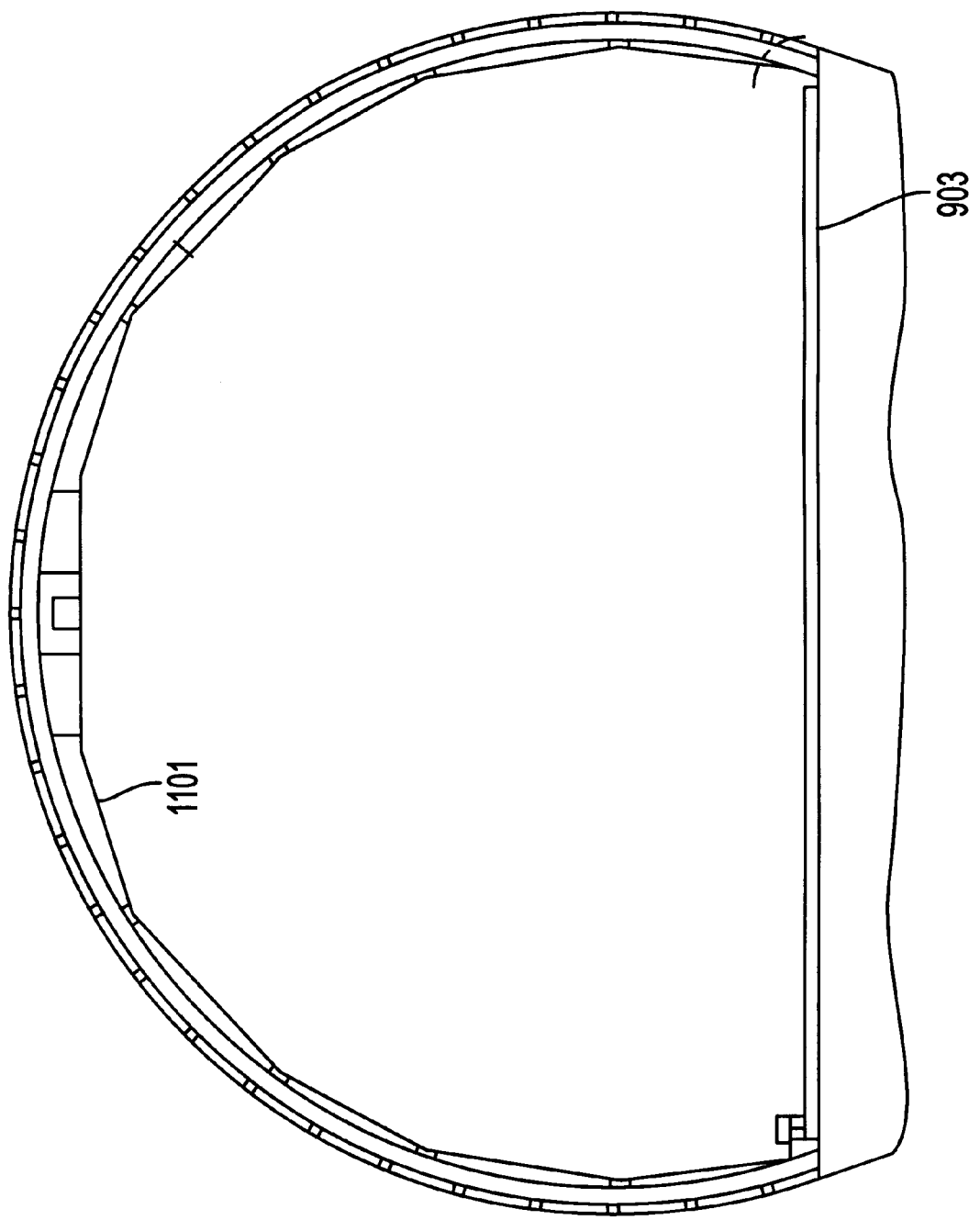
FIG. 11 shows a removable canopy 1101 which can be used to simulate the volume of the aircraft at the remote location.

FIG. 11 shows a removable canopy 1101 of the same general size and contour of the aircraft ceiling which is affixed to a removable pallet 903. This specialized pallet can be used to simulate the volume of the aircraft at a remote location. Once configured, the aircraft can fly to the location, load the palletized set, and perform the reduced gravity filming. This provides a convenient mode of operations, especially for multiple set change-outs.

B. Emergency Equipment

Figure 12:
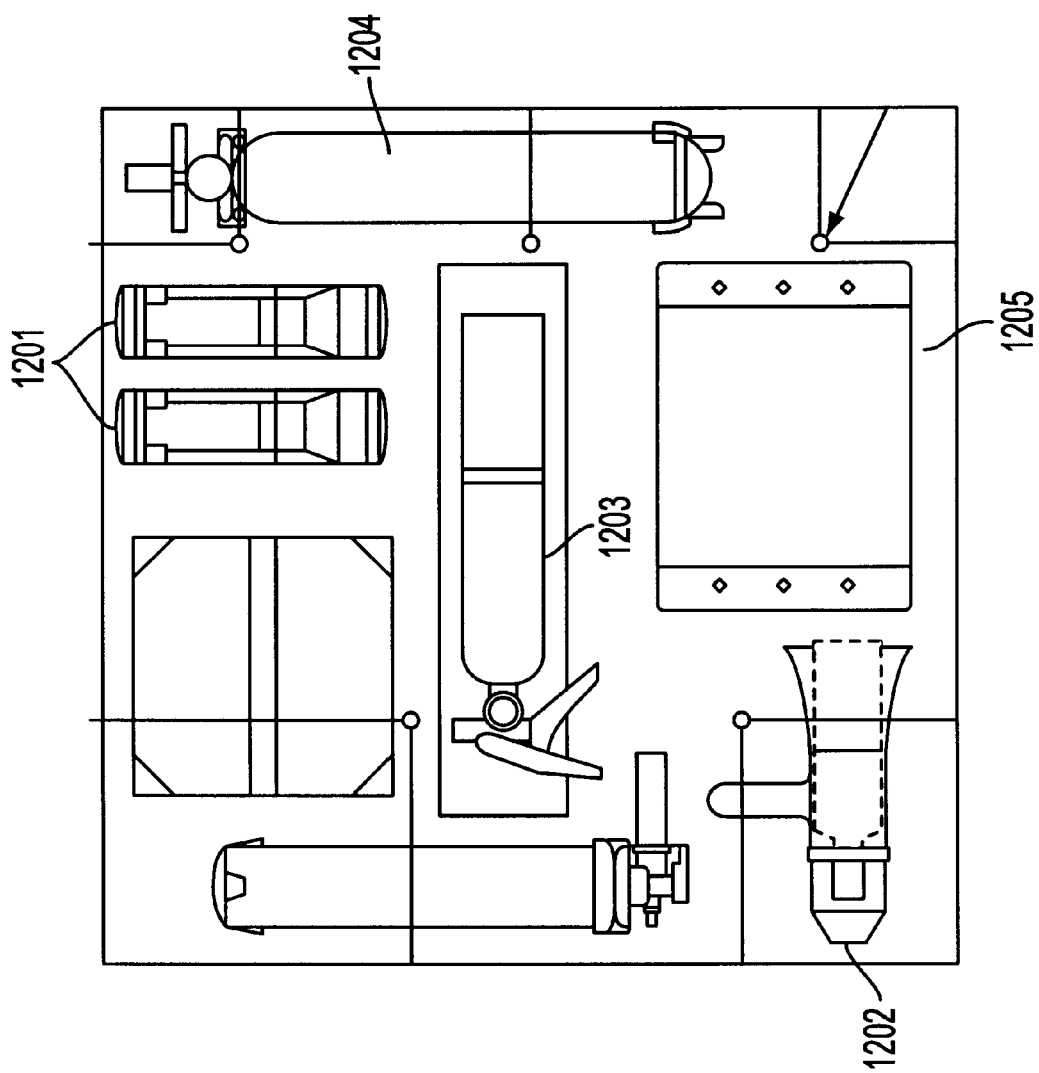

FIG. 12 shows an emergency equipment package comprising a floor or bulkhead mountable rack containing various emergency equipment such as megahorn 1202, first aid kits 1205, flashlights 1201, oxygen supply 1204 and fire extinguisher 1203, which can be rapidly mounted into an existing cargo aircraft. These items have various conventional locations on existing passenger aircraft in designated overhead bins, cabinets, and the galley area.

In a cargo aircraft, all of these storage areas have been removed to maximize the accessible cargo volume. When rapidly converting a plane to carry passengers, it is essential to be certain that none of the required equipment is left out. The emergency equipment package can be removably mounted behind the passenger seating area.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. An aircraft modified for dual purpose missions including a non-parabolic flight mission which supports conventional aircraft flight patterns and a parabolic flight mission which produces zero-gravity conditions, the aircraft including:

a hydraulic system including a hydraulic fluid reservoir, two closed volume fluid accumulators each having variable volume gas and fluid chambers isolated from each other by a movable member, a first fluid supply line which couples a return line of a master aircraft hydraulic system to the fluid chamber of each of the closed volume fluid accumulators, and two fluid valves which are each configurable to operate in a first position which permits hydraulic fluid to flow normally in the system and a second position which diverts hydraulic fluid into the two closed volume fluid accumulators during the parabolic mission;

a seating area configured with secured passenger seats in a cabin of the aircraft;

a play area in the cabin of the aircraft configured with removable padding having cushioning characteristics to cushion passengers floating in the play area during zero-gravity conditions, wherein the removable padding can be quickly installed for parabolic flight missions and quickly removed for non-parabolic flight missions; and a gill liner lining the cabin interior comprising a non-flammable material capable of self-extinguishing itself while suppressing the production of toxic gases.

2. The modified aircraft of claim 1, wherein the removable padding of the play area comprises a plurality of cargo pallets having padding affixed thereto, wherein the cargo pallets are adapted to be locked into tracks in the aircraft fuselage.

3. The modified aircraft of claim 1, wherein the removable padding of the play area comprises foam padding sections which are removably mountable to a floor of the aircraft cabin.

4. The modified aircraft of claim 1, wherein each of the two fluid valves provides a positive position indication in a cockpit of the aircraft.

5. The modified aircraft of claim 4, wherein each of the two fluid valves are powered by a separate aircraft electrical circuit which provides redundancy.

6. The modified aircraft of claim 4, further comprising a third fluid valve coupled between the hydraulic fluid return line and the hydraulic fluid reservoir, wherein the third fluid valve is operable in a first position which permits hydraulic fluid to flow normally and a second position operable during parabolic flight missions which prevents hydraulic fluid from the hydraulic fluid return line from returning to the hydraulic fluid reservoir.

7. The modified aircraft of claim 1, further comprising a first plurality of handrail support structures permanently mounted along the floor of the play area and a second plurality of handrail support structures permanently mounted along a cabin wall of the play area.

8. The modified aircraft of claim 1, further comprising an accelerometer display system, removably mountable in a cockpit of the aircraft, which calculates and displays flight correction information based on ideal parabolic flight data.

9. The modified aircraft of claim 1, further comprising emergency exit track lighting installed along a wall of the play area of the cabin.

10. The modified aircraft of claim 9, further comprising overhead informational lights which are recessed into a ceiling of the aircraft cabin and which do not interfere with a cargo operation of the aircraft.

11. The modified aircraft of claim 1, further comprising a modified emergency oxygen system including oxygen delivery units which are mounted into a ceiling of the aircraft between frame ribs of the aircraft and including elongated mask support straps which reach from the ceiling of the aircraft to passengers seated in the passenger seats.

12. The modified aircraft of claim 1, further comprising a plurality of removable pallets which are securable to a floor of the aircraft and which include a plurality of protruding bolt holes according to a predefined bolt pattern.

13. The modified aircraft of claim 1, further comprising a removable safety equipment kit including at least a flashlight, a fire extinguisher, and a first aid kit, wherein the removable safety equipment kit is self-contained and removable as a unit from the aircraft.

14. The modified aircraft of claim 1, further comprising a canopy-covered cargo pallet adapted to be removably mounted into the play area of the aircraft, wherein the canopy approximates the shape and height of the aircraft walls and ceiling.

15. An aircraft conversion kit for converting an existing cargo aircraft into a passenger aircraft capable of flying parabolic flights with gravity-free conditions, comprising:

a plurality of removable padded pallets adapted to be secured to a flooring structure of the existing cargo aircraft, the padded pallets providing sufficient cushioning to cushion passengers floating in a predefined play area of the cargo aircraft during parabolic flight operations;

a plurality of hand grips adapted to be attached to support structures permanently mounted along the floors and walls of the existing cargo aircraft;

a plurality of removable seating pallets adapted to be secured to the flooring structure of the existing cargo aircraft, the removable seating pallets including a plurality of passenger seats and further comprising a removable accelerometer display system which is removably mountable in a cockpit of the aircraft and which calculates and displays flight correction information based on ideal parabolic flight data.

16. The aircraft conversion kit of claim 15, wherein the plurality of removable padded pallets comprise a naugahyde surface attached to foam padding.

17. An aircraft that can be quickly converted between a cargo mission and a parabolic flight mission, the aircraft including a cabin and a cockpit and further comprising:

a hydraulic system including a hydraulic fluid reservoir, two closed volume fluid accumulators each having variable volume gas and fluid chambers isolated from each other by a movable member, a fluid supply line which couples a return line of a master aircraft hydraulic system to the fluid chamber of each of the closed volume fluid accumulators, and two fluid valves each configurable to operate in a first position which permits hydraulic fluid to flow normally in the system and a second position which diverts hydraulic fluid into the two closed volume fluid accumulators during the parabolic flight mission, wherein each of the two fluid valves provides a positive position indication in the cockpit, and wherein each of the two fluid valves is powered by a separate aircraft electrical circuit to provide redundancy;

a removable seating area configured with passenger seats and securably mounted in the cabin;

a play area in the cabin configured with removable padding having cushioning characteristics to cushion passengers floating in the play area during parabolic flights, wherein the removable padding is adapted for quick installation for parabolic flight missions and quick removal for cargo flight missions;

a gill liner lining the cabin interior comprising a non-flammable material capable of self-extinguishing itself while suppressing the production of toxic gases;

a plurality of support anchors permanently mounted to a wall of the cabin in the play area which permit passengers to secure themselves during flight;

an accelerometer display system, mounted in the cockpit of the aircraft, which calculates and displays flight correction information based on ideal parabolic flight data;

emergency exit track lighting installed along a wall of the play area of the cabin in such a manner that it does not interfere with cargo operation;

a plurality of overhead informational lights recessed into a ceiling of the cabin and which do not interfere with a cargo operation of the aircraft; and a modified emergency oxygen system including oxygen delivery units mounted into a ceiling of the aircraft between frame ribs of the aircraft and including elongated mask support straps which reach from the ceiling of the aircraft to passengers seated in the passenger seats.

18. An aircraft modified to operate in either a cargo configuration using conventional flight patterns or a parabolic flight configuration which creates zero gravity conditions in the aircraft, the aircraft comprising:

a modified hydraulic system including a plurality of hydraulic valves which, when activated, divert hydraulic fluid from a master fluid reservoir to a redundant hydraulic fluid accumulator system which prevents cavitation of hydraulic fluid during zero gravity conditions, wherein the plurality of hydraulic valves are configured such that failure of one valve causes the modified hydraulic system to continue operating normally;

a floor padding structure defining a play area of sufficient size to permit passengers to freely float about a cabin of the aircraft and cushion impacts on the floor, wherein the floor padding structure is easily removable from the aircraft to support the cargo configuration and easily installable in the aircraft to support the parabolic flight configuration;

a seating area including a plurality of passenger seats in a cabin of the aircraft;

a modified emergency oxygen system permanently installed into a ceiling of the aircraft cabin without substantially obstructing the cargo area and including elongated mask support cords which drop down to permit use of oxygen masks by seated passengers; and a modified emergency lighting system including a plurality of track lights installed along the walls of the aircraft cabin which lead to exits.

19. The aircraft according to claim 18, wherein the padding structure comprises a plurality of removable pallets which mate with existing cargo securing tracks in a fuselage of the aircraft.

20. The aircraft according to claim 18, further comprising a permanently installed gill liner lining the interior of the aircraft cabin, the gill liner having both fire-suppressing and toxic gas suppressing characteristics.

21. A method of rapidly converting an aircraft from a cargo configuration into a passenger configuration capable of flying parabolic flights with gravity-free conditions, comprising the steps of:

(1) temporarily installing removable padding to the floor of the aircraft, wherein the padding is sufficiently pliable to cushion passengers during parabolic flights;

(2) temporarily installing removable seats in the aircraft in an area separate from the padded area installed in step (1);

(3) temporarily installing hand grips along a plurality of anchors permanently fixed to support structures in the aircraft; and (4) switching a master hydraulic system of the aircraft to a dual-accumulator bypass system which prevents cavitation of hydraulic fluid during gravity-free maneuvers while providing fail-safe operation.

22. The method of claim 21, further comprising the step of:

(5) activating an accelerometer display system in a cockpit of the aircraft, wherein the accelerometer display system displays flight correction information based on an ideal parabolic flight path.

23. The method of claim 22, further comprising the step of flying the aircraft in a parabolic flight pattern with passengers while monitoring the flight correction information displayed by the accelerometer display system.

24. The method of claim 23, further comprising the step of removing all temporarily installed equipment and switching the master hydraulic system to regular operation after a flight.

25. The method of claim 24, further comprising the step of flying the aircraft for a cargo mission.

* * * * *

UNITED STATES PATENT AND TRADEMARK OFFICE
CERTIFICATE OF CORRECTION

PATENT NO.: 5,971,319

DATED: October 26, 1999

INVENTOR(S): Byron K. LICHTENBERG, *et al.*

It is certified that an error appears in the above-identified patent and that said Letters Patent is hereby corrected as shown below:

On the title page, item [75] "Inventors":

The first inventor's first name is misspelled, delete "BRYON" and insert --BYRON--.

In the Specification, Column 6, Line 42:

The word --If-- should be inserted before "all".

Signed and Sealed this

Second Day of May, 2000

Q. TODD DICKINSON

*Attest:*

*Attesting Officer*      Director of Patents and Trademarks